United States Patent

[11] 3,574,882

| [72] | Inventors | Ronald G. Petry<br>Xenia;<br>Ralph W. Edwards, Dayton, Ohio |
|---|---|---|
| [21] | Appl. No. | 846,068 |
| [22] | Filed | July 30, 1969 |
| [45] | Patented | Apr. 13, 1971 |
| [73] | Assignee | General Motors Corporation<br>Detroit, Mich. |

[54] WINDSHIELD WASHER PUMP ASSEMBLY
9 Claims, 14 Drawing Figs.
[52] U.S. Cl. ................................................ 15/250.02
[51] Int. Cl. ................................................ A47i 1/00
[50] Field of Search ........................................ 15/250.02

[56] References Cited
UNITED STATES PATENTS

| 2,936,476 | 5/1960 | Ziegler | 15/250.02 |
| 2,965,913 | 12/1960 | Ziegler | 15/250.02 |
| 3,503,090 | 3/1970 | Romanowski | 15/250.02 |

*Primary Examiner*—Paul R. Gilliam
*Attorneys*—W. E. Finken and W. A. Schuetz

ABSTRACT: In a preferred form, this disclosure relates to a windshield cleaning apparatus having a wiper unit and a washer unit including a programmed washer pump assembly for intermittently delivering a predetermined number of squirts of washing fluid to the windshield each time it is energized. The washer pump assembly includes a reciprocable pump having a spring-actuated delivery stroke and an interruptible driving connection with a wiper unit motor. The washer pump assembly further includes a control and timer mechanism which is operable, when momentarily energized, to establish a driving connection between the pump and the wiper unit motor for a predetermined number of wiper strokes and then to automatically and abruptly interrupt the driving connection therebetween. The washer pump assembly is also operably to deliver a squirt of washer fluid to the windshield prior to the wipers of the wiper unit having moved very far from their parked position when both units are simultaneously energized.

Patented April 13, 1971

INVENTORS
Ronald G. Petry, &
BY Ralph W. Edwards

W. A. Schwartz
ATTORNEY

INVENTORS
Ronald G. Petry, &
BY Ralph W. Edwards

ATTORNEY

INVENTORS
Ronald G. Petry, &
BY Ralph W. Edwards

W.A.Schutz
ATTORNEY

WINDSHIELD WASHER PUMP ASSEMBLY

The present invention relates to a window or windshield cleaning apparatus, and more particularly to a washer pump assembly for delivering washing fluid for a predetermined time interval to a windshield of a vehicle.

Known programmed washer pump assemblies for intermittently squirting washing fluid onto a windshield for a predetermined time interval or number of wiper strokes have included a reciprocable, plunger or piston-type pump having a spring-actuated delivery stroke and an interruptible driving connection with the wiper unit motor. The interruptible driving connection was effected by providing a lost motion drive connection between the pump plunger and wiper unit motor and by providing a control and timer mechanism which included a wiper stroke counting means in the form of an indexible ratchet wheel having a cam thereon which engaged a lug or tab on the pump plunger to hold the latter against movement through its delivery stroke when the ratchet wheel is indexed to a stop position. The driving connection for the pump was established by rotatably indexing the ratchet wheel and cam from the stop position to allow the pump plunger to be spring actuated through its delivery stroke, the ratchet wheel being successively indexed for a predetermined number of wiper strokes until it completed one revolution and was again in its stop position in which the cam held the plunger against movement through its delivery stroke. Such a washer unit is shown in U.S. Pat. No. 3,078,493. These known programmed washer units have also included a ratchet wheel and cam wherein the cam had a steep rise portion which interfered with the movement of the plunger on the indexing movement next preceding stoppage of the pump plunger and the ratchet wheel was provided with a flexible tooth which yielded to permit relative movement between the ratchet wheel and the pump plunger to allow the latter to clear the rise portion during the last indexing movement. This provision enabled the pump to be abruptly shut off with the resulting advantages that each of the squirts of the washer pump were at a constant pressure and that no or only minimal wastage of fluid resulted. Such a washer unit is shown in copending application Ser. No. 701,443, filed Jan. 29, 1968 and assigned to the same assignee as the present invention.

Although the above known programmed washer pump assemblies have been highly satisfactory in operation, efforts are nevertheless being made to improve their efficiency and durability as well as to reduce their cost of manufacture. Accordingly, the washer pump assembly of the present invention is an improvement over the above-described known types of washer units. In accordance with one aspect of the present invention, a novel control and timer mechanism is provided which is both simpler and more economical in construction. In accordance with another aspect of the present invention, the flexible tooth for the ratchet cam assembly is one end of a torsion spring carried by the ratchet wheel and with the other end of the torsion spring serving to retain the ratchet wheel on a post as well as provide a frictional drag to prevent or substantially prevent overrotation or reverse rotation of the ratchet wheel. In yet another aspect of the present invention the pump assembly is operable to rapidly deliver a relatively high volume squirt of washer fluid against the windshield, when energized.

Accordingly, it is an object of the present invention to provide a new and improved washer pump assembly of the character referred to above and which has a relatively high volume output, is highly efficient in operation, which includes a control and timer mechanism of relatively simple and durable construction and which is more economical than control and timer mechanisms heretofore employed.

Another object of the present invention is to provide a new and improved washer pump assembly which includes a control and timer mechanism operable to establish a driving connection between the pump and a drive means for a predetermined time period and then automatically interrupt the driving connection therebetween, and wherein the control and timer mechanism comprises an indexible ratchet wheel having an annular drum portion on one side thereof which is provided with at least one axially extending slot, a drive pawl which is constantly reciprocated by the drive means and a control means for controlling engagement between the drive pawl and the ratchet wheel, the control means including a reciprocable plunger biased toward a normal position in which it holds the drive pawl spaced from the ratchet wheel, but which is movable to a retracted position when momentarily energized to allow the pawl to engage the ratchet wheel to index the same, and which is movable to an intermediate position when the control means is deenergized in which it rides on the annular drum portion until it is again aligned with the slot whereupon it returns to its normal position to hold the pawl disengaged from the ratchet wheel to shut off the washer pump.

Yet another object of the present invention is to provide a new and improved washer pump assembly which includes a control and timer mechanism operable to establish a driving connection between the washer pump and a drive motor to fully reciprocate the pump plunger through its strokes for a predetermined time interval and then to abruptly interrupt the driving connection therebetween, and in which the control and timer mechanism includes an indexible ratchet wheel provided with a cam having an abrupt rise portion extending generally radially of the ratchet wheel and a circumferentially extending dwell portion for engaging a lug on the pump plunger when the ratchet wheel is in its stop position to hold the latter against movement through its delivery stroke and thus interrupt the driving connection between the pump plunger and the drive motor, and in which the ratchet wheel carries a torsion spring having one end which extends through an opening in the ratchet wheel to provide a flexible tooth which yields when the rise portion of the cam engages the lug on the reciprocable pump plunger to enable the lug to move along and clear the rise portion and which then causes the ratchet wheel to complete its indexing movement to move the dwell portion from the lug portion to prevent movement of the pump plunger to abruptly shut off operation of the pump and wherein the torsion spring at its other end is received within the groove in a post for rotatably supporting the indexible ratchet wheel to hold the latter in place as well as provide a drag force to prevent over or reverse rotation of the ratchet wheel whereby the torsion spring serves the triple function of providing a flexible tooth, retaining the ratchet wheel means on its post as well as provide a drag force for preventing over or reverse rotation of the ratchet wheel.

A further object of the present invention is to provide a new and improved windshield cleaning apparatus having a wiper unit including a wiper for wiping the windshield, a washer unit for delivering washing fluid to the windshield and a manually operable control means for initiating conjoint operation of the wiper and washer units, wherein the washer unit includes a washer pump assembly having a reciprocable pump normally maintained in a charged condition and having an interruptible driving connection with the wiper unit, and a control mechanism operable to establish a driving connection between the pump and wiper unit for a predetermined time interval and then to automatically interrupt the driving connection therebetween, and wherein the control mechanism is operatively connected with the wiper unit and of a construction and arrangement such that it allows the charged pump to move through its discharge stroke to deliver a squirt of washing fluid to the windshield prior to the wiper having moved any appreciable distance from its parked position when both the units are simultaneously energized.

The next preceding object is accomplished, in the preferred embodiment, by providing an intermediate tooth between two normally spaced teeth on the ratchet wheel of the ratchet cam assembly and by having the ratchet pawl, which is reciprocated by the wiper unit, in a position such that it will engage this intermediate tooth when both the wiper and washer units are simultaneously energized. This provides for an immediate movement of the ratchet cam assembly from its stop position to allow the pump to move through its discharge stroke when both units are simultaneously energized. The pump is actuated to deliver a squirt of cleaning fluid against the windshield prior to the wipers having moved any significant distance from their parked position whereby the windshield is wetted ahead of the wipers as they are being moved through their first stroke.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

Figure 1:
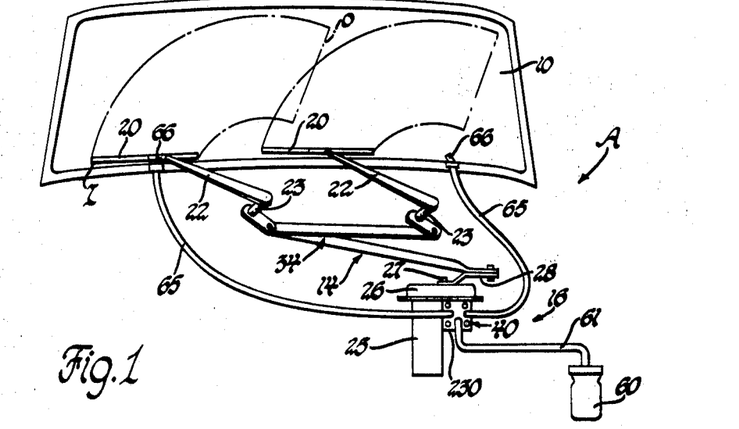
FIG. 1 is a schematic view of a windshield cleaning apparatus embodying the present invention.

As representing a preferred embodiment of the present invention, FIG. 1 of the drawings shows a windshield cleaning apparatus A for cleaning a windshield 10 of an automotive vehicle. The windshield cleaning apparatus A broadly comprises a wiper unit 14 for wiping the windshield 10 and a programmed washer unit 16 for delivering intermittent squirts of cleaning fluid onto the windshield and which is adapted to be operated conjointly in timed relationship with the wiper unit 14 for a predetermined number of wiper strokes.

The wiper unit 14 comprises a pair of wiper blades 20 which are adapted to be moved to and fro in arcuate paths across the windshield 10 between inboard and outboard positions I and O, respectively. The wiper blades 20 are in their inboard position when parked. The wiper blades 20 are carried by oscillatable wiper arms 22 drivingly connected to oscillatable drive pivots 23 suitably carried by the vehicle at spaced locations adjacent the lower edge of the windshield 10.

The drive pivots 23 are adapted to be oscillated by a drive mechanism which includes an electric wiper motor 25 connected via a conventional gear reduction unit 26 to a unidirectional output shaft 27 having a crank arm 28 fixed thereto. The crank arm 28 is drivingly connected with the oscillatable drive pivots 23 via a suitable or conventional linkage arrangement 34 and when rotated functions through the linkage arrangement 34 to simultaneously oscillate the drive pivots 23, which in turn causes the wiper arms 22 and blades 20 to be oscillated in tandem to and fro across the windshield through their arcuate paths, as shown by the phantom lines in FIG. 1.

Figure 2:
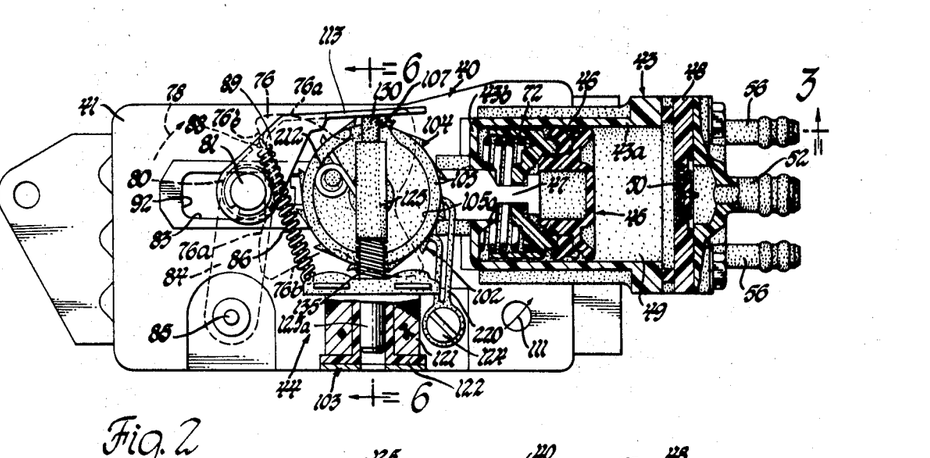
FIG. 2 is an enlarged sectional view, with portions shown in elevation, of a washer pump assembly comprising part of the windshield cleaning apparatus shown in FIG. 1 and showing the relative positions of the various parts thereof when the pump assembly is deenergized.

The washer unit 16, when actuated, is adapted to be operated conjointly with the wiper unit 14 and comprises a washer pump assembly 40 for intermittently providing squirts of washing fluid to be applied to the windshield 10. As best shown in FIG. 2, the washer pump assembly 40 comprises, in general, a support means or frame 41 which is suitably secured to the housing of the gear reduction unit 26, a washer pump 43 carried by the frame 41 and which has an interruptible driving connection with the wiper motor 25, and a control or timer mechanism 44 which is operable to establish a driving connection between the pump 43 and wiper motor 25 for a predetermined number of wiper strokes and then automatically interrupt the driving connection therebetween.

The washer pump 43 comprises a plastic pump housing 43a secured to the support frame 41 and a reciprocably movable plunger or plunger means 45 slidably received within the housing 43a. The plunger 45 includes a piston assembly 46 and a flat pump rod 47 having one end connected with the piston assembly 46 and the other end projecting rearwardly, i.e., toward the left as viewed in FIGS. 2 and 3, beyond the adjacent rearward end 43b of the housing 43a. The pump 43 also includes a valve chamber part 48 secured to the housing 43a at its forward end remote from the rod 47 and which defines with the piston 46 a chamber 49. The valve chamber part 48 contains an inlet check valve 50 for controlling communication between an inlet nipple 52 and the chamber 49 and a pair of outlet check valves 53 for controlling communication between the chamber 49 and a pair of outlet nipples 56.

The plunger 45 is adapted to be reciprocably moved through intake and discharge strokes. When the plunger 45 is moved through its intake stroke, toward the left as viewed in FIGS. 2 and 3 of the drawings, washing fluid is drawn from a reservoir 60 via conduit 61, inlet nipple 52 and past the check valve 50 into the chamber 49. When the plunger 45 is moved through its discharge stroke, toward the right as viewed in FIGS. 2 and 3, the fluid in the chamber 49 is forced under pressure past the outlet check valves 53 and delivered via outlet nipples 56 and conduits 65 to a pair of nozzles 66 mounted on the vehicle adjacent the lower edge of the windshield 10. The fluid delivered to the nozzles 66 is emitted in jet form and directed toward designated area on the windshield 10 located in the path of movement traversed by the wiper blades 20.

The plunger 45 is moved through its discharge stroke by a compression spring 72 (see FIG. 2) encircling the pump rod 47 and having one end in abutting engagement with an end wall 43b of the housing 43a and the other end in abutting engagement with the piston assembly 46 at its side opposite the chamber 49. The compression spring 72 biases the plunger 45 toward engagement with the valve chamber part 48.

Figure 4:
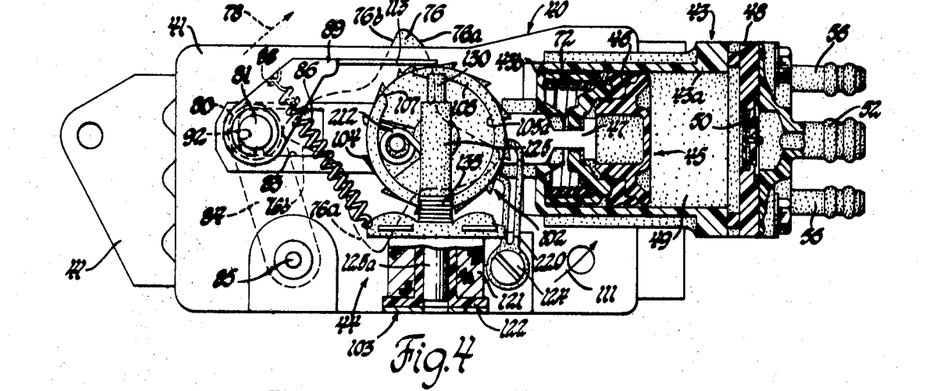
FIGS. 4 and 5 are views similar to that shown in FIG. 2, but showing certain parts thereof in different positions.
Figure 5:
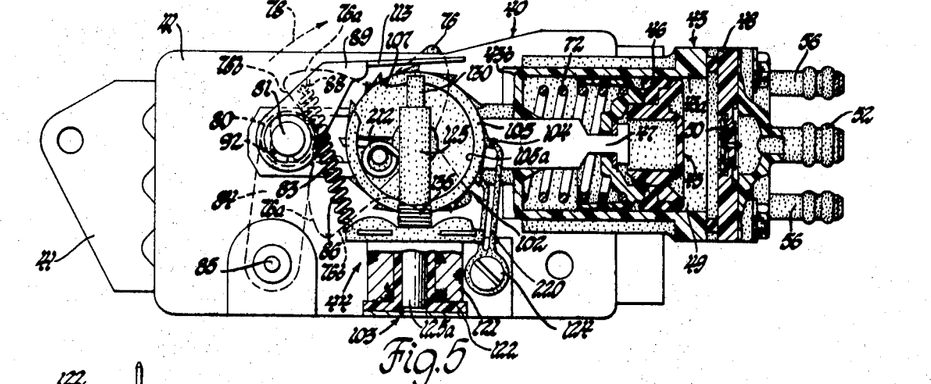

The plunger 45 is adapted to be moved through its intake stroke in opposition to the biasing force of the compression spring 72 by a drive means 75 when the washer unit 16 is placed in operation. The drive means 75 comprises a multilobed cam 76 rotatably supported by the housing of the gear reduction unit 26. As shown in FIGS. 2, 4 and 5, each lobe of the cam has a rise portion 76a and a fall portion 76b. The cam 76 is fixed on a shaft 77, the shaft 77 in turn being drivingly connected with a gear (not shown) of the gear reduction unit 26. The cam 76 is rotated in the direction indicated by the arrow 78 in FIG. 2 when rotated by the gear reduction unit 26 in response to energization of the wiper unit motor 25.

The drive means 75 further includes a cam follower means 79 for moving the plunger 45 through its intake stroke. The cam follower means 79 is biased into engagement with the periphery of the cam 76 and drivingly connected with the pump rod 47 via a lost motion connection. The lost motion connection enables the driving connection therebetween to be interrupted, as will be hereinafter more fully described.

Figure 3:
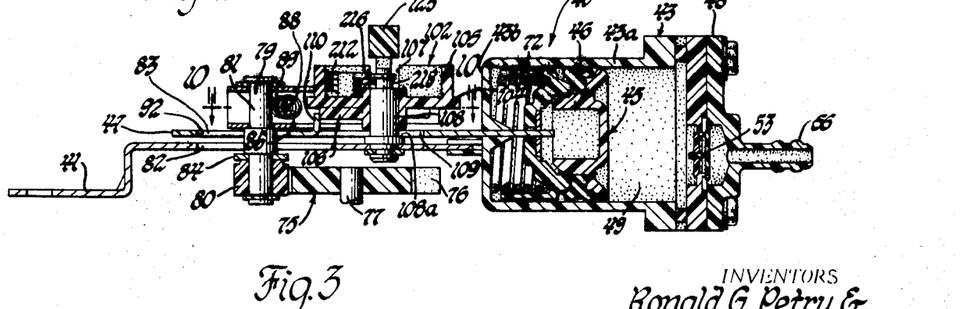
FIG. 3 is a fragmentary sectional view taken approximately along line 3—3 of FIG. 2.

The cam follower means 79 includes a cam follower member 80 which rides in peripheral engagement with the cam 76 and which is fixed to the lower end of a drive member or pin 81, as viewed in FIG. 3. The drive pin 81 projects upwardly through aligned elongated slots 82 and 83 in the frame 41 and the pump rod 47, respectively, and is connected intermediate its ends to one end of a support lever 84. The other end of the support lever 84 is pivotally connected to the support frame 41 by a pivot pin 85.

The cam follower member 80 is biased into peripheral engagement with the cam 76 by a tension spring 86 having one end secured to an armature frame 123 and the other end connected with an ear 88 on a drive pawl 89 which is pivotally connected to the upper end portion of the drive pin 81. The pawl 89 comprises part of the control mechanism 44, as will hereinafter be more fully described. The width of the slot 83 is such that it permits the pin 81 to be reciprocated by the cam 76 through an arcuate path.

The drive means 75, when the washer unit 16 is actuated, moves the plunger 45 through its intake stroke and then permits the spring 72 to move the plunger 45 through its discharge stroke during each cycle of operation. As shown in FIG. 4, when the plunger 45 is at the end of its intake stroke the cam follower member 80 will be engaged with the high point of the rise portion 76a of one of the lobes of the cam 76 and the drive pin 81 will be in engagement with the pump rod 47 at the rearward end 92 of the slot 83. As the cam 76 is rotated in the direction of the arrow 78, the compression spring 72 moves the plunger 45 through its discharge stroke to deliver a charge of washing fluid to the windshield 10 and the pump rod 47 and spring 86 move the cam follower member 80 along the fall portion 76b of the lobe of the cam 76 until the member 80 engages the low point thereof, as shown in FIG. 5. When in this position the plunger 45 will have completed its discharge stroke. Continued rotation of the cam 76 causes the rise portion 76a of the next lobe thereof to engage the cam follower member 80 and move the same toward the left, as viewed in FIGS. 4 and 5. As the cam follower member 80 moves toward the left the drive pin 81, which remained in engagement with the pump rod 47 at the rearward end 92 of the slot 83, moves the pump rod 47 of the plunger 45 toward the left in opposition to the biasing force of the spring 72. During this movement the plunger 45 moves through its intake stroke in which cleaning fluid is drawn from the reservoir 60 into the chamber 49 and the spring 72 is compressed or charged. The intake stroke is completed when the member 80 is at the high point of the rise portion 76a of this lobe of the cam 76, as shown in FIG. 4. Further rotation of the cam 76 causes the next pumping cycle to be initiated.

In accordance with the provisions of the present invention, the control or timer mechanism 44 is of a novel construction and is operable to establish a driving connection between the plunger 45 of the pump 43 and the drive means 75 for a predetermined number of wiper strokes, during which the plunger 45 is fully reciprocated through its intake and discharge strokes for each of the predetermined number of wiper strokes, and then to automatically, abruptly interrupt the driving connection therebetween after the predetermined number of wiper strokes have been completed. The advantages afforded by the novel control mechanism 44 are that the washing fluid is delivered to the windshield by the pump 43 at or at substantially the same pressure for each of the predetermined number of wiper strokes, pump efficiency is maximized and no wastage of washing fluid results. The control mechanism 44 is also operatively associated with the wiper unit 14 and constructed such that it allows the pump to be moved through its discharge stroke to deliver a charge of washer fluid to the windshield prior to the wiper blades 20 having been moved any significant distance from their parked or inboard position when both units are simultaneously energized.

The control mechanism 44, in general, includes a wiper stroke counting means in the form of an indexible ratchet cam assembly 102 for controlling operation of the pump 43 and which in turn has an interruptible driving connection with the drive pawl 89 pivotally connected to the drive pin 81 of the cam follower means 79. The control mechanism 44 also includes a control means or solenoid 103 which is operable, when momentarily energized by the operator, to establish a drive connection between the ratchet cam assembly 102 and the drive pawl 89 and which cooperates with the ratchet cam assembly 102 to automatically disconnect the drive connection therebetween upon the ratchet cam assembly being rotated one complete revolution.

As best shown in FIGS. 2—5, the ratchet cam assembly 102 includes a plastic ratchet wheel 104 having an annular hollow drum 105 and a cam 106 formed integral therewith at its upper and lower sides, respectively. The annular drum 105 has an axially extending through slot 107 in its circumferentially extending wall, and for reasons to be hereinafter more fully described. The ratchet cam assembly 102 is rotatably supported on a stub shaft or post 108 which is secured to the support frame 41 and which extends through a second elongated slot 109 in the pump rod 47, the slot 109 enabling the pump rod 47 to be reciprocated relative to the shaft 108. The stub shaft 108 includes a flanged portion 108a for seating the same on the frame 41 and for slidably supporting the pump rod 47 adjacent the lateral side edges of the slot 109.

Figure 10:
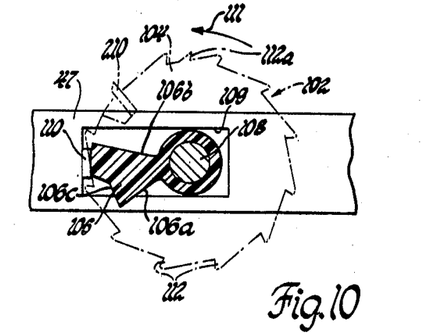
FIG. 10 is an enlarged fragmentary sectional view taken approximately along line 10—10 of FIG. 3.

The ratchet cam assembly 102 is normally disconnected from the drive pawl 89 and disposed in a stop position, as shown in FIGS. 2, 3 and 10, in which it interrupts the drive connection between the plunger 45 of the pump 43 and the cam follower means 79. When in this position the cam 106 engages a lug or tab 110 on the pump rod 47 to hold the plunger 45 against movement through its discharge stroke by the spring 72 and the spring 72 in its charged condition. The provision of the slot 83 in the pump rod 47 provides a lost motion connection between the drive pin 81 of the cam follower means 79 and the pump rod 47 to enable the drive pin 81 to move relative to the pump rod 47 so that the drive connection therebetween can be interrupted. The cam 106 (see FIG. 10) is generally wedge-shaped and has abrupt rise and fall portions 106a and 106b which extend generally radially of the ratchet wheel 104 and a stepped circumferentially extending dwell portion 106c. When the ratchet cam assembly 102 is in its stop position, the outermost step of the dwell portion 106c is in engagement with the lug 110 on the pump rod 47.

Figure 9:
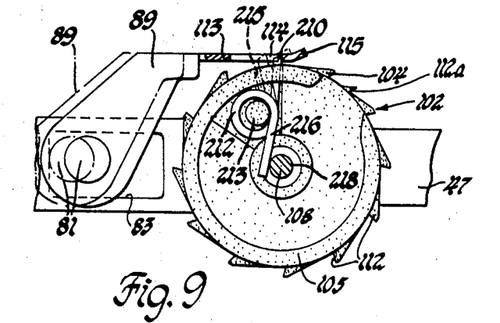
FIG. 9 is an enlarged top plan view of part of the washer pump assembly shown in FIG. 2.

The ratchet cam assembly 102 is adapted to be intermittently, rotatably indexed in the direction of the arrow 111 by the drive pawl 89 when the latter is drivingly connected therewith. To this end, the ratchet wheel 104 has a plurality of circumferentially spaced teeth 112 and the pawl 89, which is continuously moved toward and from the ratchet wheel 104 by the drive pin 81 of the cam follower means 79 when the wiper motor 25 is energized, has an end portion 113 which extends generally tangentially of the ratchet wheel 104 and which is provided with a tooth-receiving window or slot 114 (see FIG. 9). The end portion 113 of the pawl 89 is biased toward engagement with the periphery of the ratchet wheel 104 by the spring 86 and its free end 115 is adapted to hook behind the adjacently located tooth on the ratchet wheel 104 when the pawl 89 is moved through its return stroke toward the ratchet wheel and to index the ratchet cam assembly 102 in the direction of the arrow 111 when moved through its work stroke away from the ratchet wheel 104.

Although the drive pawl 89 is continuously moved through its work and return strokes by the drive pin 81 of the cam follower means 79, it is normally prevented from engaging and indexing the ratchet cam assembly 102 by the control means 103. The control means 103 comprises an annular electrically energizable coil 121 supported on a plastic spool 122, the spool in turn being supported by a U-shaped metal frame or bracket 123. The frame 123 is suitably secured to the frame 41 by screw 124. The spool 122 has a central opening 126 aligned with an opening 127 in the leg of the frame 123 adjacent the ratchet wheel, the openings slidably receiving one end of a plunger 125. The plunger 125 has a metal portion 125a which is slidably received within the opening 126 of the spool 122 and an end portion 125b made from a suitable electrically insulating material, such as plastic. The plastic portion 125b at its end remote from the coil 121 includes an axially extending end portion 130 and a transversely extending end portion 132.

Figure 6:
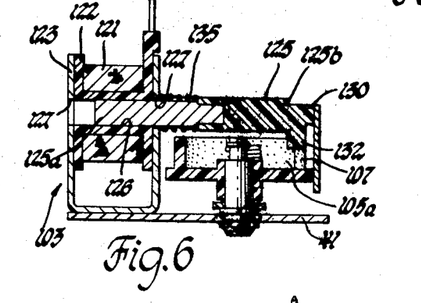
FIG. 6 is a fragmentary sectional view taken approximately along line 6—6 of FIG. 2.

The plunger 125 is biased by a compression spring 135 toward a first or normal position, as shown in FIGS. 2 and 6, in which the end portion 130 engages the end portion 113 of the pawl 89 to hold the same spaced from the ratchet wheel 104. The pawl 89 bears against and slides on the end portion 130 as it is constantly reciprocated by the wiper motor 25 when the washer unit 16 is not in operation. When in this position the transversely extending end portion 132 is disposed within the axially extending slot 107 in the drum 105. The spring 135 encircles the metal portion 125a of the plunger 125 and has one end in abutting engagement with the frame 123 and its other end in abutting engagement with the inner end of the plastic portion 125b of the plunger 125. The biasing force exerted by the spring 135 is greater than the biasing force exerted by the spring 86. The plunger 125, however, cannot disengage itself from the spool 122 because the plunger 125 has an abutment 125c which engages the upper end of the post 108 to limit outward movement of the plunger 125 from the spool.

Figure 7:
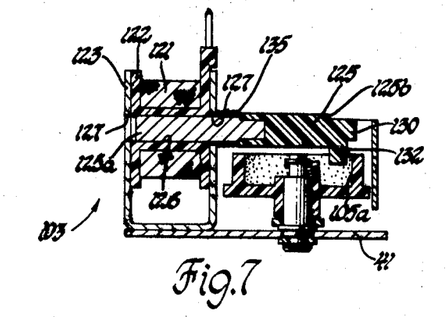
FIGS. 7 and 8 are views similar to that shown in FIG. 6, but showing certain parts thereof in different positions.

The plunger 125 is movable in response to momentary energization of the coil 121 from its first or normal position, as shown in FIGS. 2 and 6 to a retracted or second position, as shown in FIG. 7 in which it is positioned such that it permits the end 115 of the pawl 89 to engage and hook behind the adjacent tooth on the ratchet wheel 104 to index the latter. When the plunger 125 is in its second position, the end portions 130 and 132 are disposed interiorly of the drum 105 and the spring 135 is compressed.

Figure 8:
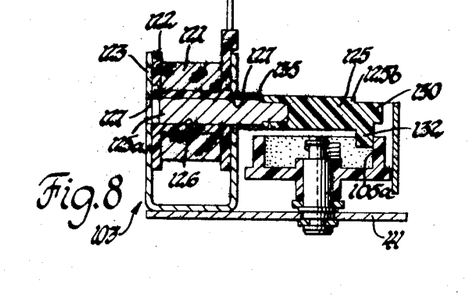

The plunger 125 is movable by the spring 135 from its retracted or second position, as shown in FIG. 7, to an intermediate or third position, as shown in FIGS. 4 and 8, when the coil 121 is deenergized. By the time that the coil 121 is deenergized, after momentary energization thereof, the ratchet wheel 104 will have been indexed one or two indexing movements so that when the spring 135 returns the plunger to its intermediate position the end portion 132 thereof will engage the interior surface 105a of the annular drum 105. When the plunger 125 is in this position, the pawl 89 can still engage the ratchet wheel 104. The plunger 125 will ride on the interior surface 105a of the drum 105 as the ratchet cam assembly 102 is indexed until it has been rotated one full revolution, at which time the slot 107 is disposed in alignment with the end portion 132. When this occurs the spring 135 will return the plunger 125 from its intermediate position to its normal position in which it engages the pawl 89 to hold the same spaced from the ratchet wheel 104 to prevent further rotation of the ratchet wheel 104.

Figure 13:
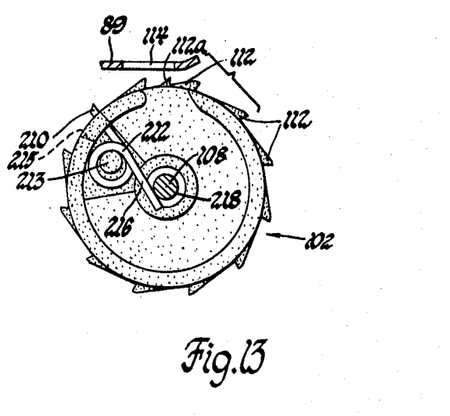
FIG. 13 is an enlarged fragmentary top plan view of part of the washer pump assembly shown in FIG. 2.

As alluded to hereinbefore, the control mechanism 44 is operable to rapidly release the pump rod 47 to allow the plunger means 45 to be moved through its discharge stroke to deliver a charge of washer fluid onto the windshield 10 to wet the same prior to the wiper blades 20 having moved very far from their parked position when both the washer and wiper units are simultaneously energized. To this end, the ratchet wheel 104 has 12 equally, circumferentially spaced teeth 112 and an intermediate tooth 112a (see FIG. 13) disposed midway between two adjacent ones of the teeth 112. When the ratchet cam assembly 102 is disposed in its stop position the tooth 112a is located adjacent the end 113 of the drive pawl 89.

Moreover, when the wiper and washer units are both deenergized, the cam 76 and the cam follower means 79 are disposed relative to each other as shown in FIG. 2. That is, the cam follower roller 80 is in engagement part way up the rise portion 76a of one of the lobes of the cam 76. The reason for this is that when the ratchet wheel 104 is indexed to release the cam 106 from the tab 110 on the pump rod 47 to allow the plunger 45 to be moved by the spring 72 through its discharge stroke, the relative positions of the cam follower roller 80 and cam 76 have to be such that the pump plunger 45 is free to move through its discharge stroke. This means that the cam follower roller has to be positioned at the beginning of the fall portion of one of the lobes of the cam 76. The time it takes for the cam follower roller 80 to be cammed from part way up the rise portion 76a of one of the lobes of the cam 76 to a position in which it is disposed at the beginning of the fall portion 76b of the lobe of the cam 76 when the wiper unit is energized has to be substantially the same as it takes for the ratchet wheel 104 to be indexed to release the plunger 45 for movement through its discharge stroke. The plunger 45 of the pump 43 also has relatively long intake and discharge strokes and hence, the work and return strokes of the ratchet pawl 89, which is drivingly connected to the cam follower means 79, is also relatively long. This makes it necessary for the ratchet wheel to be indexed a relatively large angular extent, approximately 30° in the preferred embodiment, during the work stroke of the pawl. Since the pawl 89 is positioned part way through its work stroke when both the wiper unit and washer units are deenergized, as shown in FIG. 2, and if there were no intermediate tooth, the pawl 89 would have to be moved through the remaining portion of its work stroke and then its return stroke before being engageable with the next adjacent tooth 112 of the ratchet wheel.

The provision of the intermediate tooth 112a, however, enables the pawl 89 when moved into engagement with the ratchet wheel 104 in response to energization of the control means 103 to index the ratchet wheel 15° during the remaining portion of its first work stroke when both the wiper and washer units are simultaneously energized. This 15° rotation will result in the cam 106 releasing the pump plunger 45 to allow the same to be moved through its discharge stroke to provide a charge of washer fluid against the windshield 10. Thus, the ratchet wheel 104 is immediately indexed upon energization of the control means 103, which in turn results in washer fluid being directed against the windshield 10 prior to the time the wiper blades have moved very far from their parked or inboard position, that is, less than a quarter of their first outboard stroke. The ratchet pawl 89 upon engaging the next adjacent tooth 112 will again index the ratchet wheel 15° and will thereafter index the ratchet wheel 30° for each subsequent indexing movement.

Figure 14:
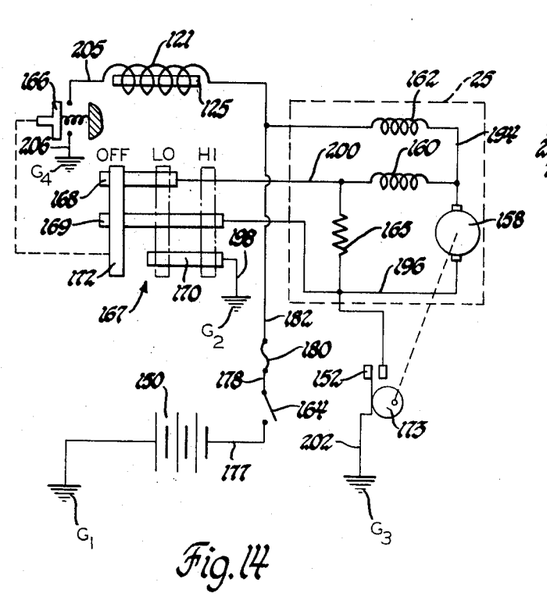
FIG. 14 is a schematic circuit diagram for controlling operation of the windshield cleaning apparatus shown in FIG. 1.

Operation of the windshield cleaning apparatus A will be described with reference to the schematic control circuit means or diagram shown in FIG. 14. The control circuit means includes a DC battery 150 having one terminal connected to ground $G_1$, a park switch 152 for the wiper unit 14, the coil 121 for the washer unit, the electric wiper motor 25 which includes an armature 158 and shunt and series field windings 160 and 162, respectively, an ignition switch 164, a resistor 165, a manually operable washer switch 166, and a manually operable wiper switch 167 having stationary terminals 168, 169 and 170 and a movable bridging member 172. The movable bridging member 172 of the wiper switch is movable between an off position, a low speed position and a high speed position. The washer switch 166 is a pushbutton switch which is spring-biased toward an open position, as shown in FIG. 14, but manually depressible or movable to a closed position. Also the washer switch 166 is operatively connected with the bridging member 172 of the wiper switch 167 so that when the washer switch 166 is moved to its closed position it automatically cams the bridging member 172 to its low speed position whereby conjoint operation of the wiper and washer units can be effected merely by depression of the washer switch 166.

The wiper and washer switches can be of any suitable or conventional construction, and preferably comprise a combined switch structure, such as that shown in U.S. Pat. No. 2,948,792. The park switch 152 is in the form of a leaf spring which is self-biased toward a closed position, but is normally held in an open position by a cam 173 connected with the wiper motor when the windshield wipers are in their parked or inboard position.

When the operator of the vehicle desires low speed operation of the wiper unit 14, he will move the bridging member 172 from its off position to its low speed position, as shown by the dotted lines in FIG. 14. Movement of the bridging member 172 to its low speed position causes all three stationary contacts 168—170 to be bridged to provide a conductive path therebetween. When the bridging member 172 is in the low speed position circuits are completed for energizing the series and shunt field windings and armature of the wiper motor 25. The circuits are from battery 150, wire 177, now closed ignition switch 164, wire 178, fuse 180, wire 182, series field winding 162, wire 194, motor armature 158, wire 196, stationary contact 169, bridging member 172, stationary contact 170, wire 198 to ground $G_2$. A circuit is also completed from wire 194, shunt field windings 160, wire 200, stationary contact 168, bridging member 172, stationary contact 170, wire 198 to ground $G_2$. In the low speed position the shunt field windings are fully energized. The completion of these circuits energizes the wiper motor 25 to operate the windshield wipers at low speed.

When the wiper switch bridging member 172 is moved from its low speed position to its off position, the aforedescribed circuits are broken, since bridging member disengages stationary contact 170 when in its off position. The wiper motor 25, however, remains energized until the wipers reach their parked or inboard position by providing holding circuits through the park switch 152. The park switch 152, which is self-biased toward a closed position remains closed until the windshield wiper motor 25 moves the windshield wipers to their parked or inboard position at which time the cam 173 engages the park switch 152 to move the same to its open position to break the holding circuits to deenergize the wiper motor 25. The holding circuits are from armature 158, wire 196, park switch 152, wire 202 to ground $G_3$ and from shunt field windings 160, wire 200, resistor 165, wire 196, park switch 152, wire 202 to ground $G_3$.

When the operator desires high speed operation, he will move the bridging member 172 of the wiper switch 167 to its high speed position, as indicated by the phantom lines in FIG. 1. Movement of the bridging member 172 to this position causes only the stationary contacts 169 and 170 of the wiper switch 167 to be bridged. When in this position the hereinbefore described circuit for energizing the series field windings and armature 158 of the wiper motor is completed. The hereinbefore described circuit for energizing the shunt field windings through ground $G_2$ is not completed, since the bridging member 172 does not bridge the contacts 168 and 170 in the high speed position. When the bridging member 172 is moved to the high speed position, the shunt field windings are energized via a circuit through the resistor 165 whereby the shunt field windings are only partially energized which causes the wiper motor to operate at high speed and in a manner well-known to those skilled in the art. This latter circuit is from battery 150, wire 177, now closed ignition switch 164, wire 178, fuse 180, wire 182, series field windings 162, wire 194, shunt field windings 160, wire 200, resistor 165, wire 196, stationary contact 169, bridging member 172, stationary contact 170, wire 198 to ground $G_2$.

When the wiper and washer switches 167 and 166 are both in their off position and the operator desires conjoint operation of the wiper unit and the washer unit, he need merely momentarily depress the washer switch 166. Depression of the washer switch 166 causes a circuit to be completed to energize the coil 121 of the washer unit. This circuit is from battery 150, wire 177, now closed ignition switch 164, wire 178, fuse 180, wire 182, coil 121, wire 205, now closed washer switch 166, wire 206 to ground $G_4$. Depression of the washer switch button also causes the bridging member 172 of the wiper switch to be cammed to its low speed position to effect energization of the wiper motor, and in a manner hereinbefore described. Thus, both the washer unit and the wiper unit will be simultaneously or substantially simultaneously energized.

When the coil 121 is energized, it causes the plunger 125 to be moved from its normal position, as shown in FIGS. 2 and 6 to its retracted position, as shown in FIG. 7, in which the end portion 132 thereof is disposed interiorly of the drum 105. This allows the spring 86 to move the pawl 89 into engagement with the adjacent intermediate tooth 112a of the ratchet wheel 104. Since the pawl 89 is positioned such that it will be moved through the remainder of its work stroke, i.e., toward the left as viewed in FIG. 2, the end 115 of the pawl will hook behind the intermediate tooth 112a and cause the ratchet wheel 104 to be indexed in the direction of the arrow 111. The ratchet wheel 104 will be indexed 15° during its first indexing movement.

As the ratchet wheel 104 is indexed in the direction of the arrow 111 during its first indexing movement, the outer step of the dwell portion 106c of the cam 106 is disengaged from the lug 110 on the pump rod 47. This allows the charged spring 72 to move the plunger 45 of the pump 43 through its discharge stroke. The plunger 45 when moved through its discharge stroke supplies fluid under pressure to the nozzle 66 from which the fluid is squirted against the windshield 10 and in the path of movement of the wiper blades 20. When the plunger 45 of the pump 43 moves through its discharge stroke, the drive pin 81 of the cam follower means 79 is engaged by the pump rod 47 at the rearward end 92 of the slot 83 to effect the driving connection between the pump rod and the cam follower means 79. The pawl 89 is moved through its return stroke, toward the right, as viewed in FIG. 2, when the plunger is moved through its discharge stroke.

As best shown in FIG. 10, the ratchet wheel 104 only has to be rotated a slight angular extent during the first indexing movement to release the pump rod 47 for movement through its discharge stroke. Moreover, this movement occurs as soon as the pawl 89 is allowed to engage the ratchet wheel and results in the charge of washer fluid being directed against the windshield 10 prior to the blades 20 having moved very far from their parked position, i.e., prior to the blades having moved through a quarter of their outboard stroke. Thus, the washer pump has a fast response which insures that the windshield 10 will be wetted prior to the blades being moved very far through their first outboard stroke.

Although the spring 135 tends to return the plunger 125 towards its normal position when the coil 121 is deenergized after being momentarily energized, the plunger 125 will only be returned to its intermediate position, as shown in FIGS. 4 and 8, in which the transversely extending end portion 132 thereof engages the interior surface 105a of the annular drum 105. This is because the time it takes the coil 121 to be momentarily energized and then deenergized is greater than the time required for indexing the ratchet wheel at least one indexing movement, and hence, the slot 107 will no longer be in alignment with the transversely extending portion 132 and the latter will engage the interior surface 105a of the drum 105. The ratchet wheel will be indexed 15° during its second indexing movement and will be indexed an angular extent equal to 30° for each subsequent indexing movement. As the ratchet wheel 104 is being indexed the end portion 132 will ride on the interior surface 135 of the drum 105. This operation continues for 11 indexing movements.

Figure 11:
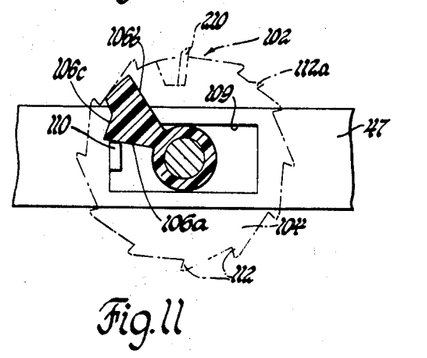
FIGS. 11 and 12 are sectional views similar to that shown in FIG. 10, but showing certain parts thereof in different positions.

On the 12th indexing movement of the ratchet cam assembly 102, the rise portion 106a of the cam will move into the path of movement of the lug 110 on the pump rod 47. As best shown in FIG. 11, as the plunger is being moved through its intake stroke, toward the left as viewed in FIG. 11, the lug on the rod will engage the rise portion 106a of the cam 106 and interfere with the indexing movement of the ratchet wheel 104. This engagement between the lug 110 on the pump rod 47 and the rise portion 106a of the cam 106 occurs during the latter portion of the 12th indexing movement of the ratchet wheel 104.

Figure 12:
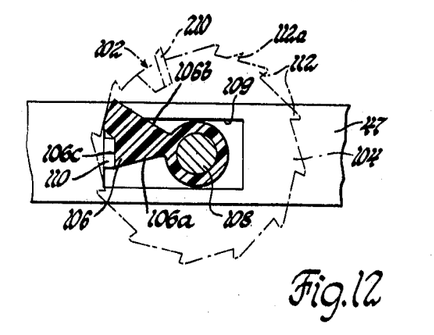

To preclude any jamming action between the lug 110 and the rise portion 106a of the cam 106, which could cause breakage of the parts, the ratchet wheel 104 is provided with a flexible tooth 210 which is engaged by the drive pawl 89 during the 12th indexing movement. The flexible tooth yields to allow the lug 110 on the pump rod 47 upon engagement of the rise portion 106a of the cam 106 to clear the latter and then functions to rotate the ratchet cam assembly 102 through the remaining portion of the 12th indexing movement to position the lower step of the dwell portion 106c in front of the lug 110 of the pump rod 47, as shown in FIG. 12, to prevent the plunger from being moved through its discharge stroke upon completion of the intake stroke. This interrupts the driving connection between the pump rod 47 and the cam follower means 79, and with the latter now moving relative to the pump rod 47 due to the provision of the slot 83 in the pump 47.

The flexible tooth 210 comprises one end portion of a torsion spring 212 carried within the drum 105. The torsion spring is disposed around an integral post 213 within the drum 105 of the ratchet wheel 104 to hold the same in place and the flexible tooth end portion 210 extends through a circumferentially extending slot 215 in the sidewall of the ratchet wheel 104. The spring bias is such that the tooth is normally biased into engagement with the ratchet wheel 104 at the rightmost end of the slot, as viewed in FIG. 9, and is disposed midway between two adjacent rigid teeth. The tooth end 210 projects radially outwardly an extent equal to the radial extent of the other ratchet teeth 112.

The flexible tooth 210 is of sufficient stiffness to enable the drive pawl 89 to rotate the ratchet cam assembly 102 during the 12th indexing movement until the rise portion 106a of the cam 106 interferes with the lug 110 on the pump rod 47. When this interference takes place, the drive pawl 89, which continues to move away from the ratchet wheel causes the tooth 210 to yield and be moved in the direction of the arrow 111 relative to the ratchet wheel, the extent of relative movement being indicated by the difference between the dotted and phantom line positions in FIG. 9. When the lug 110 on the pump rod 47 clears the rise portion 106a of the cam 106, the biasing force of the spring causes the ratchet wheel 104 to be rotated through the remaining portion of this indexing movement such that the lower step of the dwell portion 106c of the cam 106 is disposed in front of the lug 110 on the pump rod 47. When this occurs, the driving connection between the pump rod and the cam follower means is interrupted, since the plunger cannot be moved through its discharge stroke by the spring 72.

The torsion spring 212 also serves to hold the ratchet cam assembly 102 on the post 108 and to provide a frictional drag force to resist relative rotation between the ratchet wheel and the post. To this end, the other end portion 216 of the torsion spring 212 is disposed within an annular circumferentially extending groove 218 in the post and engages the bottom of the groove. The engagement between the other end portion 216 of the torsion spring 212 and the post 108 prevents movement of the ratchet wheel axially of the post and serves to prevent over or reverse rotation of the ratchet wheel 104. The teeth 112 on the ratchet wheel 104 are tapered along their leading edge so that when the drive pawl 89 is moved through its return stroke it will engage the leading edge and be deflected radially outwardly until it hooks over the next adjacent tooth. In order to insure against reverse rotation of the ratchet wheel 104 while the drive pawl 89 is being moved through its return strokes, an antibacklash lever 220 secured to the support frame 41 is provided.

The driving connection between the pawl 89 and the ratchet wheel 104 is automatically interrupted on the next 13th indexing movement of the ratchet wheel 104. As the ratchet wheel 104 is moved through its 13th indexing movement, the slot 107 will be aligned with the plunger 125 and the spring 135 will return the plunger to its normal position in which it holds the drive pawl 89 spaced from the ratchet wheel 104 while providing a bearing surface to allow the pawl 89 to be reciprocated relative thereto.

Also, during the last 13th indexing movement of the ratchet wheel 104, the lug 110 on the pump rod is cammed from the lower step surface onto the upper step surface of the dwell portion 106c of the cam 106. This further charges the spring 72 and positions the slot 83 in the pump rod 47 such that the drive pin 81, which moves within the slot 83 during the wiper operation, will not engage the pump rod 47 at the rearward end 92 of the slot 83 so as to prevent any clicking noise. To prevent any dirt, etc., from coming into engagement with the washer pump assembly a removable cover 230 attached to the frame is provided.

From the foregoing, it should be apparent that the washer unit provides a predetermined number of squirts of washing fluid against the windshield. After washer operation is automatically terminated, the wipers continue to operate at low speed until the wiper switch 167 is manually moved from its low speed position to its off position.

If the wiper unit is already operating at either low or high speed and the washer switch 166 is depressed, the washer operation will be the same as above-described.

From the foregoing, it should be apparent that a novel washer pump assembly which rapidly provides a charge of washer fluid against the windshield upon being energized has been provided. It should also be apparent that the control or timer mechanism 44 is of a relatively simple, durable and economical construction. Additionally, it should be apparent that the provision of the torsion spring which serves the dual function of providing a flexible tooth as well as to hold the ratchet wheel on its post eliminates the need for a separate part for holding the ratchet wheel on the post.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

We claim:

1. A washer pump assembly for delivering washing fluid for a predetermined time interval to a windshield of a vehicle comprising: a support means, a washer pump supported by said support means and having a movable pumping member for delivering washing fluid under pressure, a drive means including a drive member having an interruptible driving connection with said pumping member and effecting movement of the latter when drivingly connected therewith, and a control mechanism operable to establish a driving connection between said pumping member and said drive member to effect movement of the pumping member for a predetermined time interval and then to automatically interrupt the driving connection therebetween, said control mechanism comprising a ratchet timer means including a toothed ratchet wheel and an annular drum on one side of the ratchet wheel and at least one axially extending through slot in its sidewall thereof, a ratchet pawl which is constantly reciprocated by said drive means and which is biased toward engagement with the ratchet wheel and a control means operatively associated with said ratchet timer means and said ratchet pawl for controlling engagement and disengagement between said ratchet pawl and said ratchet wheel, said control means including a reciprocable plunger means having a normal position in which end portions thereof are disposed within said slot and engage said pawl to hold the same spaced from said ratchet wheel, biasing means for biasing said plunger means toward its normal position, said plunger means being movable to a second position in which its end portions are disposed interiorly of said annular drum of the ratchet timer means in response to momentary energization of the control means to allow said pawl to engage the ratchet wheel and index the same, and said plunger means being movable by said biasing means to a third position in which at least one end portion thereof rides on the interior annular surface of the drum of the ratchet wheel when the control means is deenergized, said ratchet timer means when indexed through its first indexing movement being effective to establish a driving connection between the pumping member and the drive member, said ratchet timer means being operable to effect a disconnection of the driving connection between the pumping and drive members after a predetermined number of indexing movements of the ratchet wheel has occurred, said plunger means being returnable by said biasing means toward its normal position in which it holds the pawl disengaged from the ratchet wheel when said slot is again in alignment with said plunger means after a predetermined number of indexing movements of the ratchet wheel has occurred.

2. A washer pump assembly for intermittently delivering washing fluid for a predetermined time interval to a windshield of a vehicle comprising: a support means, a washer pump supported by support means and having a pumping member which is movable in opposite directions through intake and discharge strokes, first spring means for effecting movement of said pumping member through its discharge stroke, a drive means having a lost motion, interruptible driving connection with said pumping member and when drivingly connected with said pumping member alternately effecting movement of the latter through its intake stroke in opposition to the biasing force of said spring means and permitting said spring means to move said pumping member through its discharge stroke, and a control mechanism operable to establish a driving connection between said pumping member and said drive means to effect movement of said pumping member through its intake and discharge strokes for a predetermined number of strokes and then to interrupt the driving connection therebetween, said control mechanism comprising an indexible ratchet cam assembly normally disposed in the stop position in which it is engageable with a means on said pumping member to hold the same against movement through its discharge stroke, said indexible ratchet cam assembly including a ratchet wheel and an annular drum on one side of the ratchet wheel and which has at least one axially extending through slot in its side thereof, a ratchet pawl operatively connected with said drive means and constantly reciprocated thereby, said ratchet pawl also being movable between the first position in which it is spaced from said ratchet wheel and a second position in which it is in engagement with said ratchet wheel for indexing the latter, and a control means for controlling movement of said ratchet pawl between its positions, said control means including a selectively energizable coil, a reciprocable plunger and second spring means for normally biasing said plunger toward a first position in which first and second end portions thereof are respectively disposed within said axially extending slot in said drum and engage said ratchet pawl to hold the same in its first position, said plunger means being movable from its first position in opposition to the biasing force of said second spring means toward a second position in which the second end portion thereof is disposed interiorly of said drum to allow said pawl to be moved toward its second position in engagement with the ratchet wheel to index the latter in response to momentary energization of said coil, said plunger means being movable by said second spring to an intermediate third position in which the first end portion thereof rides on the interior surface of said annular drum when said ratchet wheel has been indexed at least one indexing movement and said coil is deenergized, said indexible ratchet means being disengageable from said pumping member during the first indexing movement thereof to allow said first spring means to move said pumping member through its discharge stroke and establish a driving connection between the pumping member and the drive means, said indexable ratchet means being reengageable with said pumping member to hold the same against movement after a predetermined number of indexing movements of the ratchet wheel, and said slot in said drum being positioned in alignment with said plunger means to allow the plunger means to move from its third position to its first position to disengage the pawl from the ratchet wheel after a predetermined number of indexing movements of the ratchet wheel.

3. A washer pump assembly for intermittently delivering washing fluid for a predetermined time interval to the windshield of a vehicle comprising: a support means, a washer pump supported by said support means and having a pumping member which is movable in opposite directions through intake and discharge strokes, spring means for effecting movement of said pumping member through its discharge stroke, drive means having an interruptible driving connection with said pumping member and when drivingly connected with said pumping member alternately effecting movement of the latter through its intake stroke in opposition to the biasing force of said spring means and permitting said spring means to move said pumping member through its discharge stroke, and a control mechanism operable to establish a driving connection between said pumping member and said drive means to effect movement of said pumping member through its full intake and discharge strokes for a predetermined number of strokes and then to abruptly interrupt the driving connection therebetween whereby washing fluid is delivered at substantially the same pressure for each of the discharge strokes and no wastage of washing fluid results, said control mechanism including an indexible ratchet cam assembly including a ratchet wheel and cam normally disposed in a stop position in which it is engageable with a means on the pumping member to hold the same against movement through its discharge stroke, a reciprocable ratchet pawl drivingly connected with said drive means, said ratchet pawl also being movable between a first position in which it is spaced from said ratchet cam assembly and a second position in which it is in engagement with the ratchet cam assembly for indexing the latter, and a control means operatively associated with said ratchet pawl for effecting engagement between said ratchet pawl and said wheel for a predetermined number of indexing movements of the latter and then automatically moving the ratchet pawl to its first position to disengage the same from the ratchet wheel, said ratchet cam assembly permitting said spring means to move said pumping member through its discharge stroke when indexed away from its stop position and interfering with said means on said pumping member when being indexed during its last indexing movement prior to interrupting the driving connection between the pumping member and the drive means, a post carried by said support means for rotatably supporting said indexible ratchet cam assembly, said post including a groove, and yieldable means carried by said ratchet cam assembly and having one end disposed within said groove to retain the ratchet cam assembly on said post and exert a frictional drag force for resisting relative rotation between the post and ratchet cam assembly and its other end extending through an opening in said ratchet wheel to provide a flexible tooth, said flexible tooth yielding to permit relative movement between said ratchet cam assembly and said means on said pumping member when said ratchet cam assembly is being indexed through said last indexing movement to abruptly interrupt the driving connection between the pumping member and said drive means.

4. A washer pump assembly as defined in claim 3 where said ratchet cam assembly includes an annular drum portion having an axially extending slot therein and wherein said control means comprises a selectively energizable coil, a plunger and a second spring for biasing said plunger away from said coil toward a first position in which first and second end portions thereof are respectively disposed within said axially extending slot and engage said pawl to hold the latter in its first position, said plunger being retractable to a second position in which said second end portion is disposed interiorly of said annular drum to allow said pawl to engage said ratchet wheel in response to energization of said coil, and said plunger means being movable by said second spring to an intermediate third position upon said ratchet wheel being indexed and in which said second end portion engages the interior surface of the annular drum, said plunger riding on the interior surface of the drum until said first end portion is again in alignment with said axially extending slot whereupon said second spring moves said plunger to reengage said pawl to return the same toward its first position in which it disengages the pawl from the ratchet wheel to stop indexing movement of the ratchet cam assembly.

5. A washer pump assembly as defined in claim 3 wherein said yieldable means is a coiled torsion spring disposed around a pin portion of said ratchet cam assembly.

6. A windshield cleaning apparatus for cleaning a windshield of an automotive vehicle comprising: a wiper unit including a pair of wipers which are movable across the outer surface of the windshield between inboard and outboard positions and which are parked in the inboard position; a washer unit including a washer pump assembly for intermittently delivering squirts of washer fluid to the windshield for a predetermined number of wiper strokes; and manual control means operable to initiate conjoint operation of the wiper unit and washer unit, said washer pump assembly comprising a support means, a washer pump supported by said support means and having a reciprocable pumping member which is movable in opposite directions through relatively long work and return strokes, spring means for effecting movement of said pumping member through its discharge stroke, a drive means drivingly connected with the wiper unit and including a reciprocable drive member having an interruptible driving connection with the pumping member, and a control mechanism operable to establish a driving connection between said pumping member and said drive member to effect movement of the pumping member for a predetermined number of wiper strokes and then to automatically interrupt the driving connection therebetween, said control mechanism including an indexible ratchet cam assembly normally disposed in the stop position in which it is engageable with a means on the reciprocable pumping member to hold the same against movement through its discharge stroke whereby said pump is held in a charged condition, said ratchet cam assembly including a ratchet wheel, a reciprocable ratchet pawl drivingly connected with said drive member and movable through work and return strokes, and a second control means operatively associated with said ratchet pawl for establishing a drive connection between the ratchet pawl and the ratchet wheel for a predetermined number of wiper strokes and then automatically interrupting the driving connection therebetween, said ratchet wheel having a predetermined number of equally, circumferentially spaced ratchet teeth and being indexible a predetermined angular extent by said ratchet pawl when the latter is moved through its work stroke, said ratchet wheel also having an intermediate tooth between two of the adjacent teeth and said ratchet pawl being disposed adjacent to said intermediate tooth and positioned relative to the ratchet wheel such that it is poised to be moved through its work stroke when both said wiper unit and washer unit are deenergized, said manual control means when actuated to energize both the wiper unit and washer units causing said second control means to be energized to allow the ratchet pawl to engage said intermediate tooth of the ratchet wheel to cause the ratchet wheel to be indexed from its stop position to allow the pumping member to be moved through its discharge stroke whereby washer fluid is squirted against the windshield as the wipers are beginning to move from their inboard position toward their outboard position on their first wiper stroke.

7. A windshield cleaning apparatus as defined in claim 6 wherein said ratchet cam assembly also includes an annular drum portion having an axially extending slot therein and wherein said control means comprises a selectively energizable coil, a plunger and a second spring for biasing said plunger away from said coil toward a first position in which first and second end portions remote from said coil are respectively disposed within said axially extending slot and engage said pawl to hold the latter disengaged from said ratchet wheel, said plunger being retractable to a second position in which said second end portion is disposed interiorly of said annular drum to allow said pawl to engage said ratchet wheel in response to energization of said coil, and said plunger means being movable by said second spring to an intermediate third position upon said ratchet wheel being indexed and in which said second end portion engages the interior surface of the annular drum, said plunger riding on the interior surface of the drum until said first end portion is again in alignment with said axially extending slot whereupon said second spring moves said plunger to reengage said pawl to move the latter from the ratchet wheel to stop indexing movement of the ratchet cam assembly.

8. A windshield cleaning apparatus as defined in claim 7 wherein said ratchet cam assembly has a cam for normally holding said pumping member against movement when in its stop position and which interferes with said means on said pumping member when being indexed during its last indexing movement prior to interrupting the driving connection between the pumping member and the drive member, and wherein said washer pump assembly includes a post carried by said support means for rotatably supporting said indexible ratchet cam assembly, said post including a groove, and a torsion spring carried by said ratchet cam assembly and having one end disposed within said groove to retain the ratchet cam assembly on said post and exert a frictional drag for resisting relative rotation between the post and the ratchet cam assembly and its other end extending through an opening in said ratchet wheel to provide a flexible tooth, said flexible tooth yielding to permit relative movement between said ratchet cam assembly and said means on said pumping member when said ratchet cam assembly is being indexed through said last indexing movement to abruptly interrupt the driving connection between the pumping member and said drive means whereby washing fluid is delivered at substantially the same pressure for each of the discharge strokes of the pumping member and substantially no wastage of washing fluid results.

9. A windshield cleaning apparatus as defined in claim 8 wherein said ratchet wheel has 12 equally spaced teeth and is indexed 15° during its first and second indexing movements when the pawl engages said intermediate tooth and the next following tooth and is indexed 30° each indexing movement thereafter.